United States Patent
Oide et al.

(10) Patent No.: US 11,658,371 B2
(45) Date of Patent: May 23, 2023

(54) POWER STORAGE DEVICE

(71) Applicants: KABUSHIKI KAISHA TOYOTA JIDOSHOKKI, Kariya (JP); TOYOTA JIDOSHA KABUSHIKI KAISHA, Toyota (JP)

(72) Inventors: Ryuji Oide, Kariya (JP); Hiromi Ueda, Kariya (JP); Satoshi Morioka, Okazaki (JP); Motoyoshi Okumura, Nagoya (JP)

(73) Assignees: KABUSHIKI KAISHA TOYOTA JIDOSHOKKI, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/496,392

(22) Filed: Oct. 7, 2021

(65) Prior Publication Data
US 2022/0115757 A1    Apr. 14, 2022

(30) Foreign Application Priority Data
Oct. 12, 2020  (JP) ................. JP2020-172016

(51) Int. Cl.
*H01M 50/20*  (2021.01)
*H01M 50/673*  (2021.01)
(Continued)

(52) U.S. Cl.
CPC ......... *H01M 50/673* (2021.01); *H01G 11/14* (2013.01); *H01G 11/58* (2013.01);
(Continued)

(58) Field of Classification Search
CPC ............. H01M 50/673; H01M 50/291; H01M 50/588; H01M 50/691
See application file for complete search history.

(56) References Cited

U.S. PATENT DOCUMENTS

2014/0295220 A1 * 10/2014 Mori ............... H01M 50/553
429/177

FOREIGN PATENT DOCUMENTS

JP    2007-213990 A    8/2007

* cited by examiner

Primary Examiner — Olatunji A Godo
(74) Attorney, Agent, or Firm — Sughrue Mion, PLLC

(57) ABSTRACT

A power storage device includes a power storage module, a pair of current collector plates configured to be stacked to interpose the power storage module in a first direction that is vertical, a pair of insulating plates configured to be stacked to interpose the power storage module and the pair of current collector plates in the first direction; and a pair of restraint plates configured to be stacked to interpose the power storage module, the pair of current collector plates, and the pair of insulating plates in the first direction. The power storage module is configured to include an accommodation space that accommodates an electrolytic solution together with a power generation element. A pressure adjustment valve communicating with the accommodation space is provided on a side surface of the power storage module. The insulating plate arranged on a lower side in the first direction with respect to the power storage module is configured to include a main body portion arranged between the current collector plate and the restraint plate, and a liquid receiving portion that is provided on an outer edge portion of the main body portion, is arranged at least at a position corresponding to the pressure adjustment valve when viewed from the first direction, and stores the electrolytic solution discharged from the power storage module. The main body portion and the liquid receiving portion are integrally formed.

5 Claims, 9 Drawing Sheets

(51) Int. Cl.
*H01M 12/08* (2006.01)
*H01M 12/02* (2006.01)
*H01M 50/291* (2021.01)
*H01M 50/691* (2021.01)
*H01G 11/14* (2013.01)
*H01M 50/593* (2021.01)
*H01G 11/70* (2013.01)
*H01G 11/58* (2013.01)
*H01G 11/78* (2013.01)
*H01M 50/588* (2021.01)

(52) U.S. Cl.
CPC .............. *H01G 11/70* (2013.01); *H01G 11/78* (2013.01); *H01M 12/02* (2013.01); *H01M 12/08* (2013.01); *H01M 50/291* (2021.01); *H01M 50/588* (2021.01); *H01M 50/593* (2021.01); *H01M 50/691* (2021.01)

POWER STORAGE DEVICE

CROSS REFERENCE TO RELATED APPLICATIONS

This application claims priority to Japanese Patent Application No. 2020-172016 filed on Oct. 12, 2020, the entire contents of which are incorporated by reference herein.

TECHNICAL FIELD

The present disclosure relates to a power storage device.

BACKGROUND

As a power storage device in the related art, a power storage device including a plurality of stacked power storage modules is known. In addition, as a power storage module in the related art, a bipolar battery including a bipolar electrode having a positive electrode formed on one surface of an electrode plate and a negative electrode formed on the other surface is known. An electrolytic solution exists inside the sealed power storage module. The plurality of power storage modules are stacked and restrained by restraint plates from both end portions in the stacking direction (Japanese Unexamined Patent Publication No. 2007-213990).

SUMMARY

Here, the electrolytic solution exists inside the sealed power storage modules, but there is a possibility that the electrolytic solution may leak. In the power storage device described above, it is required to suppress the liquid leakage to the outside of the device.

An object of the present disclosure is to solve the above problem and to provide a power storage device that can suppress the liquid leakage to the outside of the device.

A power storage device in the present disclosure includes a power storage module, a pair of current collector plates configured to be stacked to interpose the power storage module in a first direction that is vertical, a pair of insulating plates configured to be stacked to interpose the power storage module and the pair of current collector plates in the first direction; and a pair of restraint plates configured to be stacked to interpose the power storage module, the pair of current collector plates, and the pair of insulating plates in the first direction. The power storage module is configured to include an accommodation space that accommodates an electrolytic solution together with a power generation element. A pressure adjustment valve communicating with the accommodation space is provided on a side surface of the power storage module. The insulating plate arranged on a lower side in the first direction with respect to the power storage module is configured to include a main body portion arranged between the current collector plate and the restraint plate, and a liquid receiving portion that is provided on an outer edge portion of the main body portion and is arranged at least at a position corresponding to the pressure adjustment valve when viewed from the first direction, and stores the electrolytic solution discharged from the power storage module. The main body portion and the liquid receiving portion are configured to be integrally formed.

In this power storage device, the insulating plate is provided between the current collector plate and the restraint plate. Therefore, the insulation between the restraint plate and the current collector plate is ensured. In such a configuration, the insulating plate arranged on a lower side in the first direction with respect to the power storage module includes the liquid receiving portion that is arranged at least at a position corresponding to the pressure adjustment valve when viewed from the first direction, and stores the electrolytic solution discharged from the power storage module. Therefore, even when the electrolytic solution is discharged from the pressure adjustment valve in the power storage module, the liquid receiving portion can receive the liquid from the pressure adjustment valve. Here, the main body portion and the liquid receiving portion are integrally formed. Therefore, it is possible to suppress the liquid leakage at the boundary portion between the main body portion and the liquid receiving portion. From the above, it is possible to suppress the liquid leakage to the outside of the device.

The liquid receiving portion is configured to include a bottom wall portion and an accommodation side wall portion, and is formed in a recess shape by the bottom wall portion and the accommodation side wall portion. A drainage nozzle is provided in the liquid receiving portion, and the drainage nozzle discharges the electrolytic solution stored in the liquid receiving portion to a drainage storage portion in the power storage device. In this case, the liquid receiving portion configured in a recess shape functions as a container that receives the electrolytic solution discharged from the power storage module. Therefore, an amount of electrolytic solution that can be received by the liquid receiving portion can be increased. Furthermore, the drainage nozzle can make the electrolytic solution stored in the liquid receiving portion flow to the drainage storage portion so as not to overflow.

The bottom wall portion is configured to include an inclined portion that is inclined with respect to a plane direction of the main body portion. The drainage nozzle is configured to be provided at a position that is a lowest side of the bottom wall portion in the first direction. In this case, the liquid receiving portion can collect the received electrolytic solution by the inclined portion that is inclined. In addition, the liquid receiving portion can discharge the electrolytic solution from the drainage nozzle such that the collected electrolytic solution does not overflow.

The insulating plate may be configured to include a side wall portion extending to at least one side in the first direction at a location other than the liquid receiving portion in the outer edge portion of the main body portion. In this case, even at a location other than the liquid receiving portion, the insulating plate can ensure the insulation distance by the side wall portions. Furthermore, the side wall portions can also function as an alignment member between the insulating plate and the restraint plate.

The power storage module is configured to include current extraction surfaces at both ends in the first direction. The current collector plate that is in contact with the insulating plate having the liquid receiving portion is configured to include a flat plate portion that is in electrical contact with the current extraction surface of the power storage module, and an extraction portion that is connected to the flat plate portion and extracts a current from the power storage module. The extraction portion is provided on a side opposite the liquid receiving portion with respect to the power storage module, when viewed from the first direction. In this case, the current collector plate can extract the current with a high output. In addition, since the extraction portion is arranged on the side opposite the liquid receiving portion, it is possible to suppress the current collector plate and the restraint plate from being short-circuited via the extraction portion and the electrolytic solution.

According to the present disclosure, it is possible to provide a power storage device that can suppress the liquid leakage to the outside of the device.

DETAILED DESCRIPTION

Figure 1:
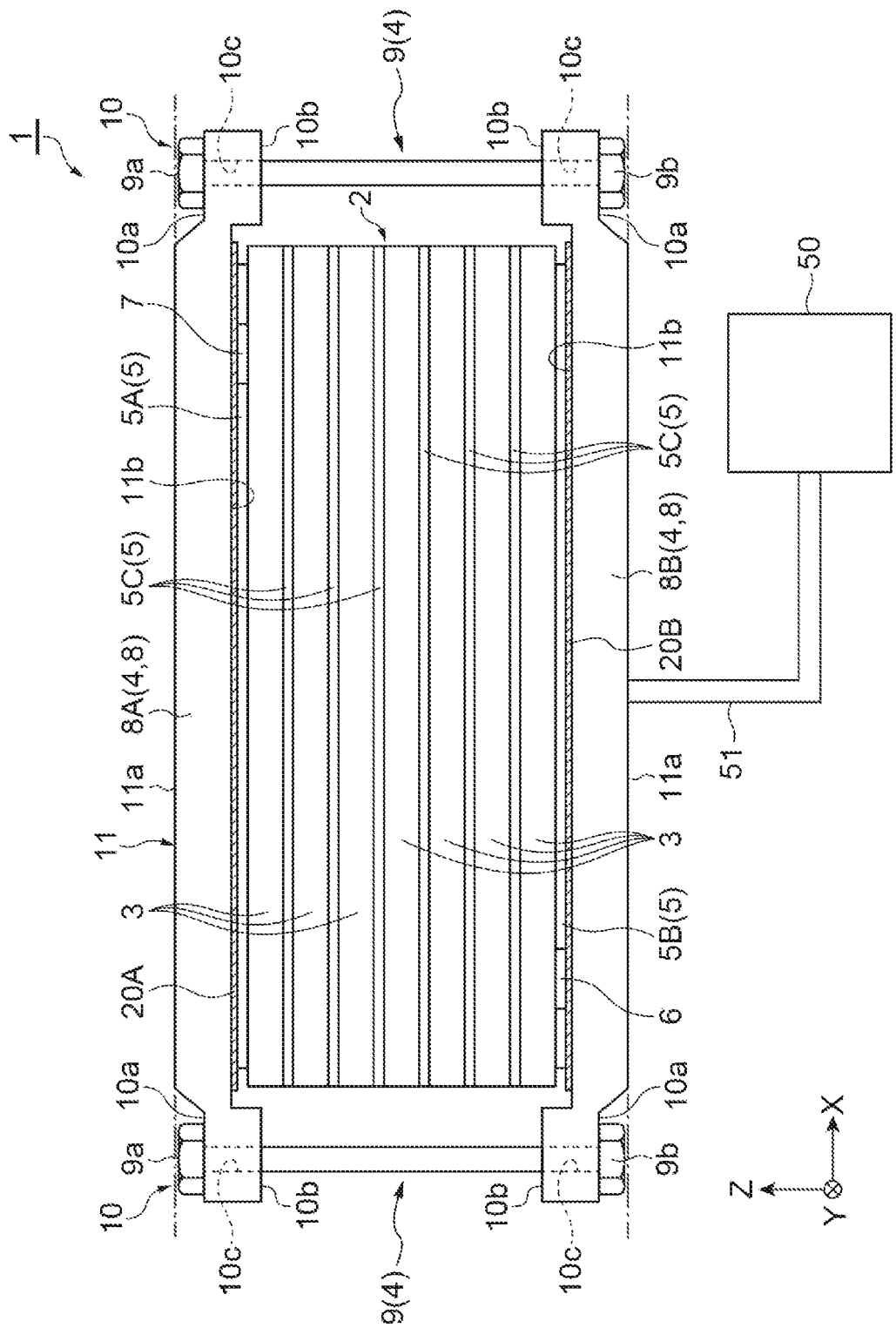
FIG. 1 is a perspective view of a power storage device according to an embodiment.

Hereinafter, embodiments of the present disclosure will be described in detail with reference to the accompanying drawings. In the description of the drawings, the same reference numerals are used for the same or equivalent elements, and duplicate descriptions are omitted.

A power storage device 1 according to the present embodiment will be described with reference to FIG. 1. FIG. 1 is a side view of the power storage device 1.

The power storage device 1 is used as a battery for various vehicles such as forklifts, hybrid vehicles, and electric vehicles. The power storage device 1 includes a module stack body 2 and a restraint member 4. The module stack body 2 includes a plurality of stacked power storage modules 3. The restraint member 4 applies a restraint load to the module stack body 2 from both sides in the stacking direction (first direction). The power storage module 3 has, for example, a rectangular shape when viewed from the stacking direction. In the present specification, for convenience of explanation, the stacking direction is defined as the Z-axis direction, the longitudinal direction of the power storage module 3 viewed from the stacking direction is defined as the Y-axis direction, and the lateral direction of the power storage module 3 is defined as the X-axis direction. The stacking direction is a direction in which the power storage module 3 and a pair of current collector plates 5A and 5B (described later) are stacked. In addition, in the present specification, the terms "upper" and "lower" are used with reference to the posture when the power storage device 1 is used. Here, the positive side in the Z-axis direction corresponds to the upper side, and the negative side corresponds to the lower side. However, the terms "upper" and "lower" are not limited to the posture of the power storage device 1 at the time of distribution. In addition, in the power storage device 1 according to the present embodiment, since an insulating plate 20A at the upper side and an insulating plate 20B at the lower side have the structure of the same effect, the insulating plate 20A may be arranged at the lower side.

The module stack body 2 includes a plurality of (7 in the present embodiment) power storage module 3 and a plurality of (8 in the present embodiment) current collector plates 5. As an example, the power storage module 3 is a bipolar battery. The power storage module 3 is a secondary battery such as a nickel hydrogen secondary battery and a lithium ion secondary battery. However, the power storage device 1 is not limited to the above-described secondary batteries, and may be, for example, an electric double layer capacitor. In the present embodiment, the power storage device 1 is a nickel hydrogen secondary battery.

The plurality of power storage modules 3 are stacked via the current collector plates 5. The power storage modules 3 adjacent to each other in the Z-axis direction are electrically connected to each other via the current collector plates 5. In the present embodiment, as illustrated in FIG. 1, the plurality of (8) current collector plates 5 are configured with a current collector plate 5A on one end side in the Z-axis direction, a current collector plate 5B on the other end side, a plurality of (6) current collector plate 5C interposed between the power storage modules 3. The current collector plates 5C are provided between the power storage modules 3 adjacent to each other in the Z-axis direction. Between the power storage modules 3 adjacent to each other in the Z-axis direction, the current collector plates 5C are contact-arranged between the electrode exposed portions of the electrode stacked bodies facing each other.

The current collector plates 5A and 5B are provided at the positive side and the negative side in the Z-axis direction of the power storage module 3 positioned at the stacking end of the plurality of power storage modules 3. In this way, the current collector plates 5A and 5B are stacked so as to interpose the power storage modules 3 in the Z-axis direction, which is the stacking direction. The Z-axis direction is vertical. As illustrated in FIG. 1, a negative electrode terminal 7 is connected to one of the current collector plates 5A. A positive electrode terminal 6 (extraction portion) is connected to the other current collector plate 5B. The negative electrode terminal 7 and the positive electrode terminal 6 protrude from the edge portions of the current collector plates 5A and 5B in the Y-axis direction. The power storage device 1 is charged and discharged via the negative electrode terminal 7 and the positive electrode terminal 6. The negative electrode terminal 7 and the positive electrode terminal 6 are provided at the end portions of the power storage device 1 at the negative side in the Y-axis direction. In addition, in the present embodiment, the negative electrode terminal 7 is provided at a position closer to the positive side in the X-axis direction, and the positive electrode terminal 6 is provided at a position closer to the negative side in the X-axis direction.

The restraint member 4 includes a pair of restraint plates 8 (a restraint plate 8A at the negative electrode terminal 7 side and a restraint plate 8B at the positive electrode terminal 6 side) that vertically interpose the module stack body 2 from both sides in the Z-axis direction, and a plurality of connecting members 9 that connect the pair of restraint plates 8. The pair of restraint plates 8 restrain the power storage module 3 and the current collector plates 5A and 5B in the Z-axis direction, which is the stacking direction. Further, the pair of restraint plates 8 are stacked so as to vertically interpose the power storage module 3, the current collector plates 5A and 5B, and the insulating plates 20A and 20B in the Z-axis direction, which is the stacking direction. The connecting member 9 applies the restraint load to the module stack body 2 in the Z-axis direction via the pair of restraint plates 8. In the present embodiment, the connecting member 9 is configured with a bolt 9a and a nut 9b for fastening a pair of restraint plates 8.

The restraint plate 8 is a rectangular metal plate having an area one size larger than areas of the power storage module 3 and the current collector plate 5 when viewed from the Z-axis direction. The restraint plate 8 includes a main body portion 11 that overlaps the module stack body 2 when viewed from the Z-axis direction, and an edge portion 10 that extends from the main body portion 11 in the X-axis direction and does not overlap the module stack body 2 when viewed from the Z-axis direction. In the present embodiment, a pair of edge portions 10 are provided on both sides of the main body portion 11 in the X-axis direction. That is, the main body portion 11 is interposed between the pair of edge portions 10. The edge portion 10 has an outer surface 10a facing the outside in the Z-axis direction (the side opposite to the power storage module 3 in the Z-axis direction) and an inner surface 10b facing the inside in the Z-axis direction (the power storage module 3 side in the Z-axis direction). The main body portion 11 has an outer surface 11a facing the outside in the Z-axis direction and an inner surface 11b facing the inside in the Z-axis direction. The outer surface 10a is positioned inside of the outer surface 11a in the Z-axis direction. The inner surface 10b is positioned inside of the inner surface 11b in the Z-axis direction.

The pair of edge portions 10 are outer edge portions extending in the longitudinal direction (Y-axis direction) of the restraint plate 8. The pair of edge portions 10 are arranged so as not to overlap the module stack body 2 when viewed from the Z-axis direction. Each edge portion 10 is provided with a plurality of insertion holes 10c into which a bolt 9a is inserted. In each edge portion 10, the plurality of insertion holes 10c are arranged so as to be separated from each other along the longitudinal direction (Y-axis direction) of the restraint plate 8. In the present embodiment, the plurality of insertion holes 10c are arranged at equal intervals from one end to the other end of the edge portion 10 in the longitudinal direction of the restraint plate 8.

A head of the bolt 9a is arranged on the outer surface 10a of the restraint plate 8A. A tip portion (screw tip) of a shaft portion of the bolt 9a protrudes from the outer surface 10a of the restraint plate 8B. A nut 9b is screwed into the tip portion of bolt 9a. The nut 9b is arranged on the outer surface 10a of the restraint plate 8B. In this way, the plurality of power storage modules 3 and the plurality of current collector plates 5 are interposed between the restraint plates 8A and 8B and are unitized as the module stack body 2. In addition, the restraint load in the Z-axis direction is applied to the module stack body 2.

An insulating plate 20A is provided between the current collector plate 5A and the restraint plate 8A. In addition, an insulating plate 20B is provided between the current collector plate 5B and the restraint plate 8B. The insulating plates 20A and 20B are members for ensuring the insulation between the current collector plates 5A and 5B and the restraint plates 8A and 8B.

Figure 2:
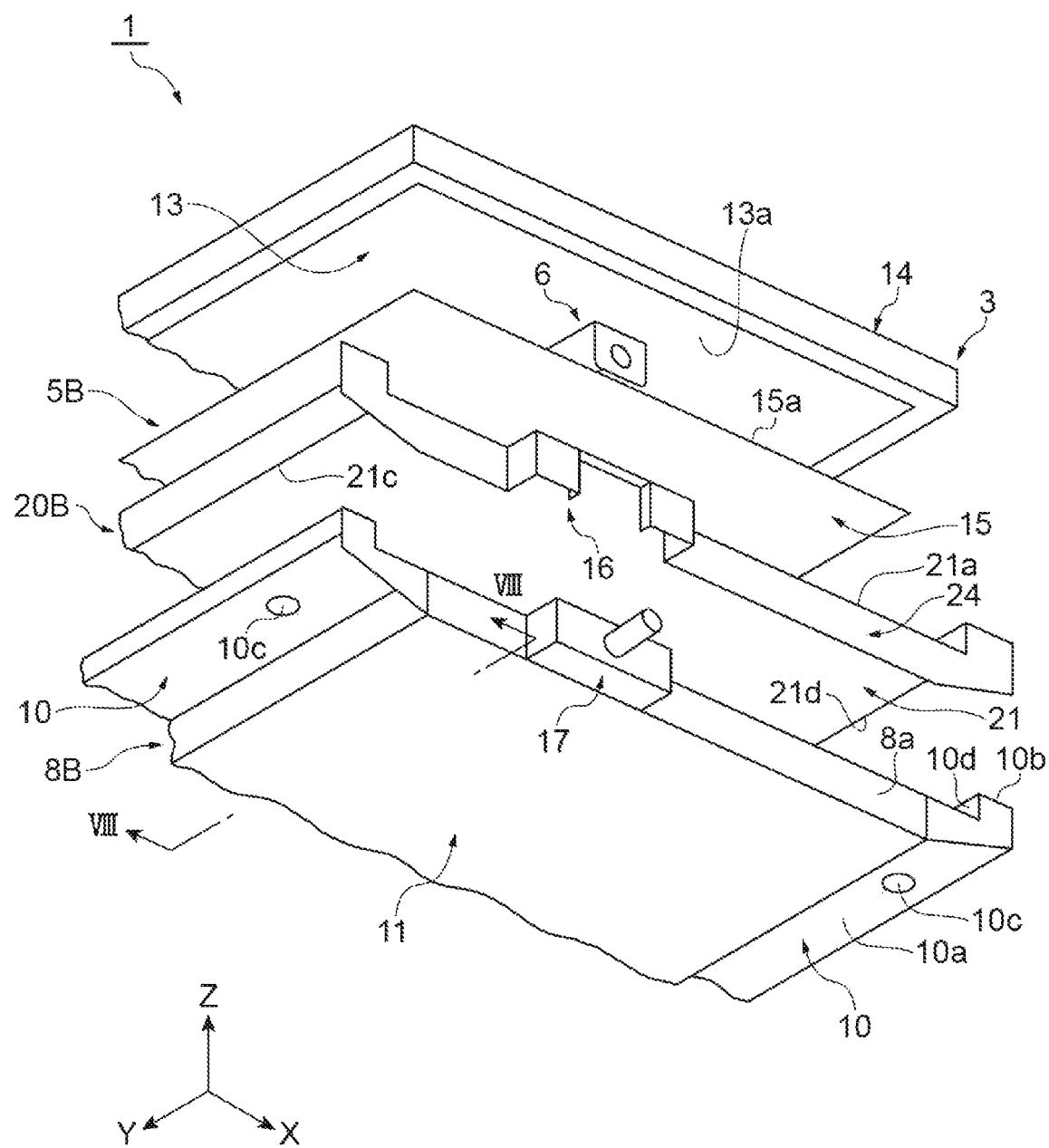
FIG. 2 is a developed perspective view of a configuration of the power storage device near an end portion on a negative side in the Z-axis direction.

Next, a configuration of the power storage device 1 near the end portion in the Z-axis direction will be described in more detail with reference to FIG. 2. FIG. 2 is a developed perspective view of the configuration of the power storage device 1 near the end portion on a negative side in the Z-axis direction. In FIG. 2, the configuration near the end portion corresponding to the negative side (positive electrode terminal 6 side) in the Z-axis direction will be described, however, near the end portion corresponding to the positive side (negative electrode terminal 7 side) in the Z-axis direction also has a structure of the same effect.

As illustrated in FIG. 2, the power storage device 1 includes the power storage module 3 at the end portion in the Z-axis direction, a current collector plate 5B, the insulating plate 20B, and the restraint plate 8B near the end portion at the negative side in the Z-axis direction. The power storage module 3, the current collector plate 5B, the insulating plate 20B, and the restraint plate 8B have a rectangular plate shape with the Y-axis direction as the longitudinal direction. The current collector plate 5B comes in contact with the insulating plate 20B having a liquid receiving portion 22 described later.

The power storage module 3 is configured with a bipolar electrode in which a positive electrode is formed on one surface of the electrode plate and a negative electrode is formed on the other surface, and a stacked body 13 (power generation element) configured by stacking a plurality of separators. In addition, a frame-shaped sealing member 14 (frame body) is provided on a peripheral portion of the stacked body 13 so that the stacked body 13 is sealed by the sealing member 14. An electrolytic solution is sealed inside the stacked body 13. The power storage module 3 has current extraction surfaces 13a at both ends in the Z-axis direction. The current extraction surface 13a is a surface for extracting the current from the power storage module 3, and is formed by exposing the electrodes of the stacked body 13 from the sealing member 14.

The current collector plate 5B includes a plane-shaped flat plate portion 15 provided for the power storage module 3 and the positive electrode terminal 6 described above. The flat plate portion 15 is in contact with the current extraction surface 13a of the power storage module 3. The whole area of the flat plate portion 15 is formed in a shape and size that overlaps with the current extraction surface 13a when viewed from the Z-axis direction. The positive electrode terminal 6 is formed on the outer edge portion 15a of the flat plate portion 15 at the negative side in the Y-axis direction. The positive electrode terminal 6 is provided on the side opposite the liquid receiving portion 22 with respect to the power storage module 3, when viewed from the Z-axis direction. The liquid receiving portion 22 is provided on the positive side in the Y-axis direction. In this way, a pair of current collector plate 5A (refer to FIG. 1) and the current collector plate 5B are provided so as to interpose the current extraction surfaces 13a on both end sides in the stacking direction. In the present embodiment, a plurality of power storage modules 3 are stacked. Therefore, the current collector plate 5A (refer to FIG. 1) is in contact with the current extraction surface 13a at the positive side in the Z-axis direction of the power storage module 3 at the positive side in the Z-axis direction, and the current collector plate 5B is in contact with the current extraction surface 13a at the negative side of the power storage module 3 in the Z-axis direction, at the negative side in the Z-axis direction. However, the power storage device 1 may include one power storage module 3. In this case, the current collector plates 5A and 5B are provided so as to interpose the current extraction surfaces 13a on both sides of one power storage module 3.

The insulating plate 20B is a member formed of an insulation material such as resin, which is provided between the current collector plate 5B and the restraint plate 8B. The insulating plate 20B is a member provided to ensure the insulation between the current collector plate 5B and the restraint plate 8B. The insulating plate 20B is arranged on the lower side (that is, the negative side in the Z-axis direction) of the power storage module 3 in the stacking direction. The insulating plate 20B is arranged so as to overlap the entire area of the flat plate portion 15 of the current collector plate 5B when viewed from the Z-axis direction. As a result, the insulating plate 20B is interposed at a location where the current collector plate 5B and the restraint plate 8B face each other, therefore, the insulation between the current collector plate 5B and the restraint plate 8B is ensured. A terminal block protection portion 16 covering the terminal block 17, which will be described later, is formed on a cover portion 24 of the insulating plate 20B at the negative side in the Y-axis direction. The more detailed configuration of the insulating plate 20B will be described later.

As described above, the restraint plate 8B includes a plane-shaped main body portion 11 and a pair of edge portions 10 in which an insertion hole 10c for inserting a bolt is formed. The terminal block 17 is provided on the outer edge portion 8a of the restraint plate 8B at the negative side in the Y-axis direction. The positive electrode terminal 6 and wiring (not illustrated) are connected to the terminal block 17.

Figure 3:
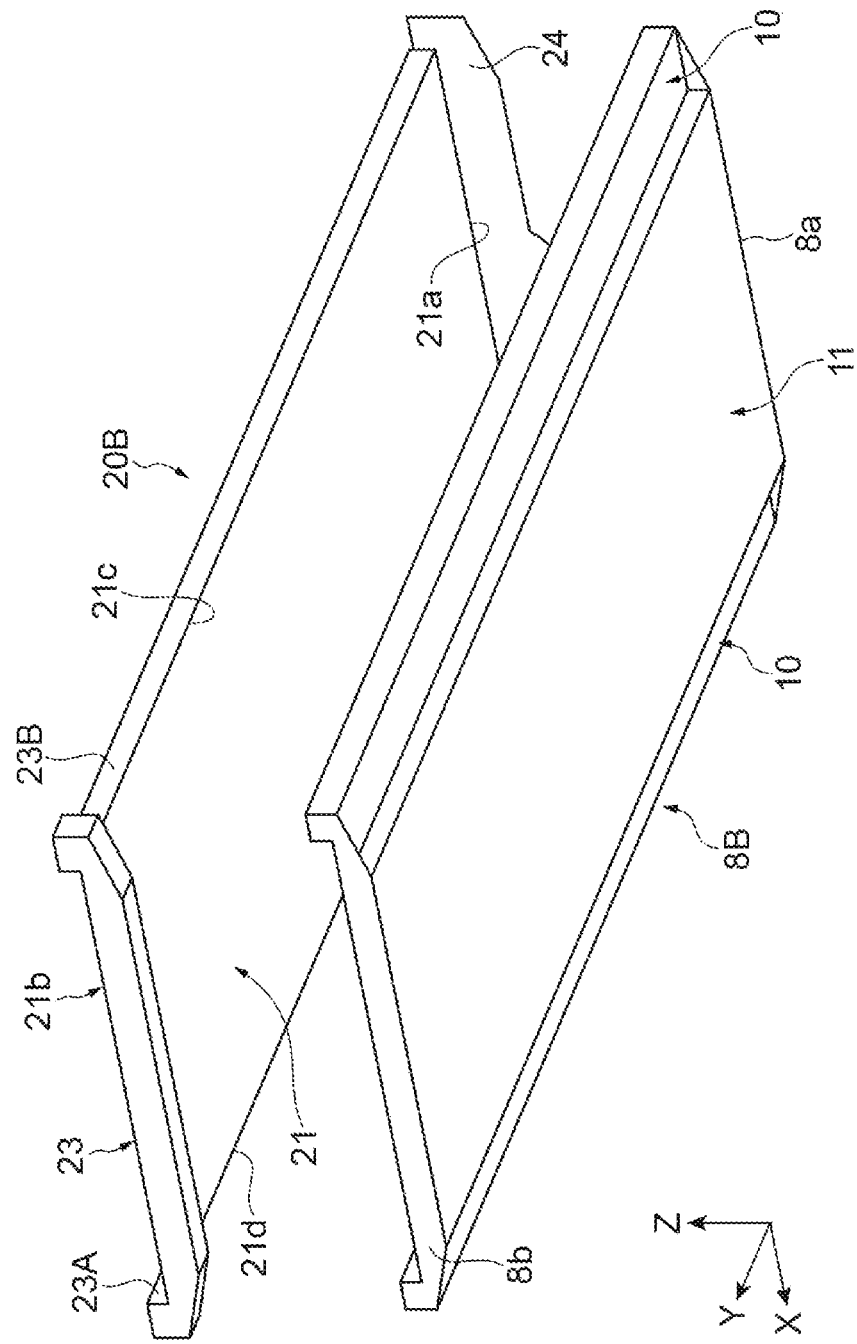
FIG. 3 is a developed perspective view illustrating an overall configuration of an insulator and a restraint plate.
Figure 4:
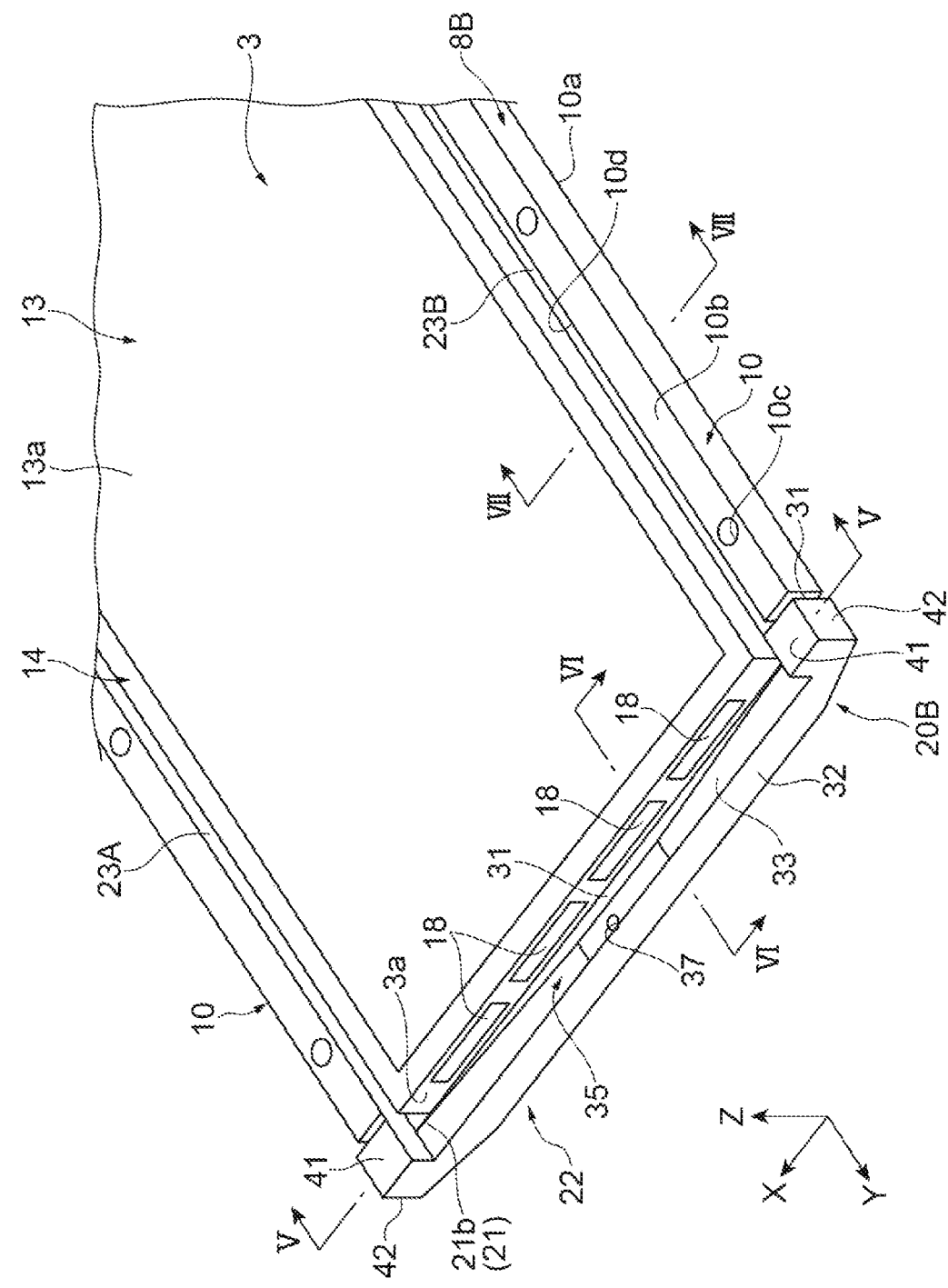
FIG. 4 is a perspective view illustrating a state in which a current collector plate, an insulating plate, and a restraint plate are assembled.
Figure 5:
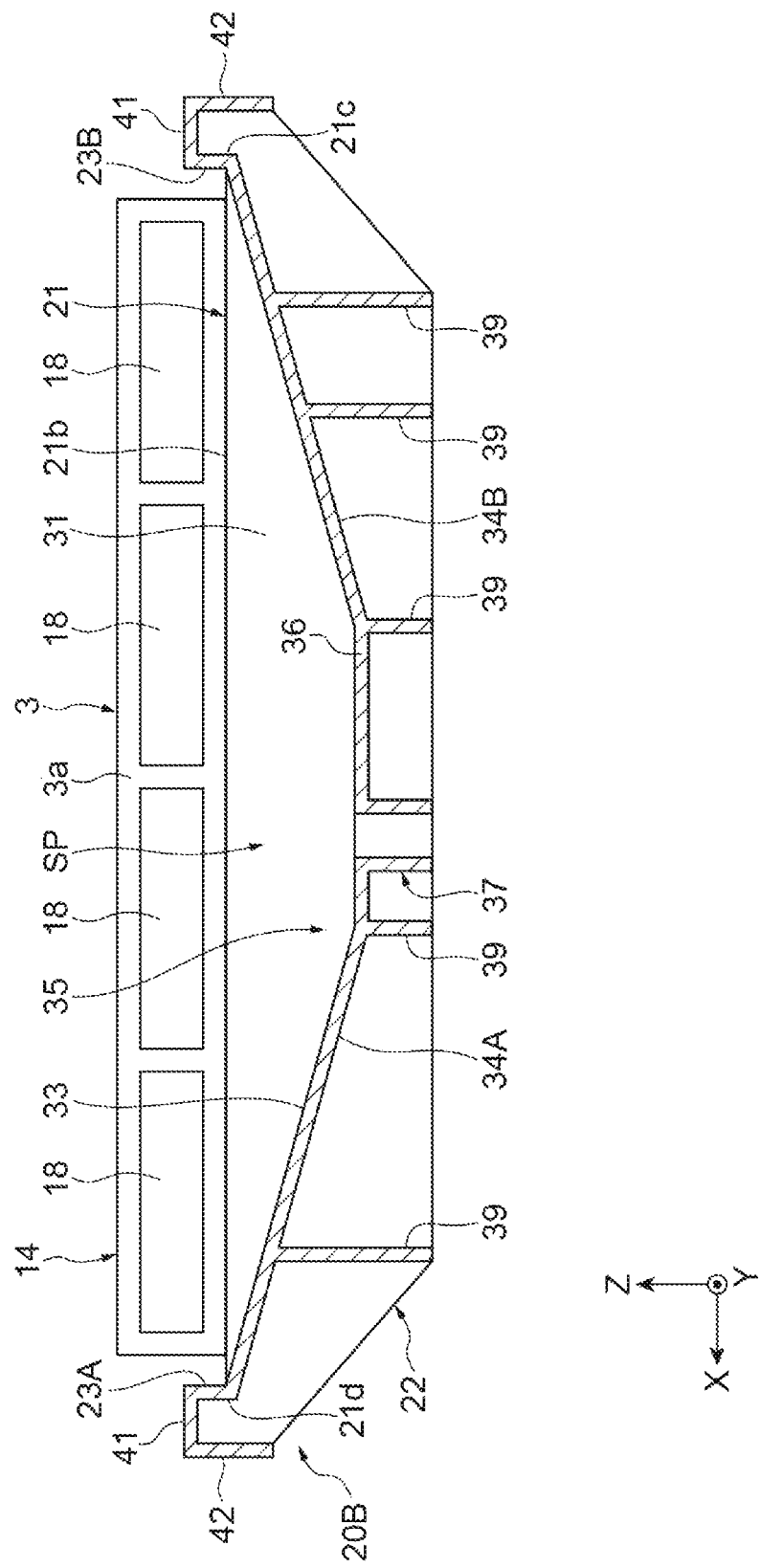
FIG. 5 is a cross-sectional view taken along the line V-V in FIG. 4.
Figure 6:
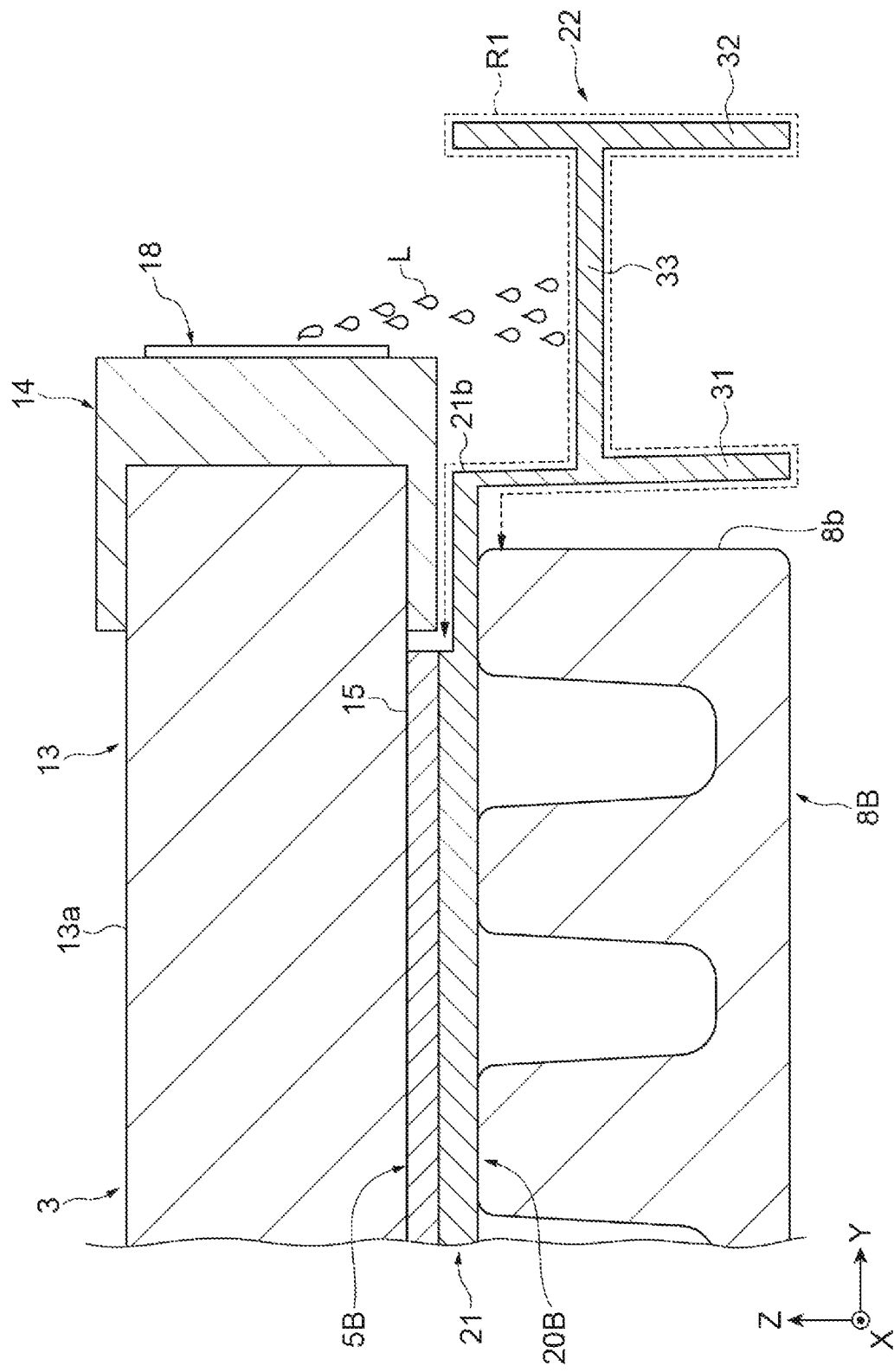
FIG. 6 is a cross-sectional view taken along the line VI-VI in FIG. 4.
Figure 7:
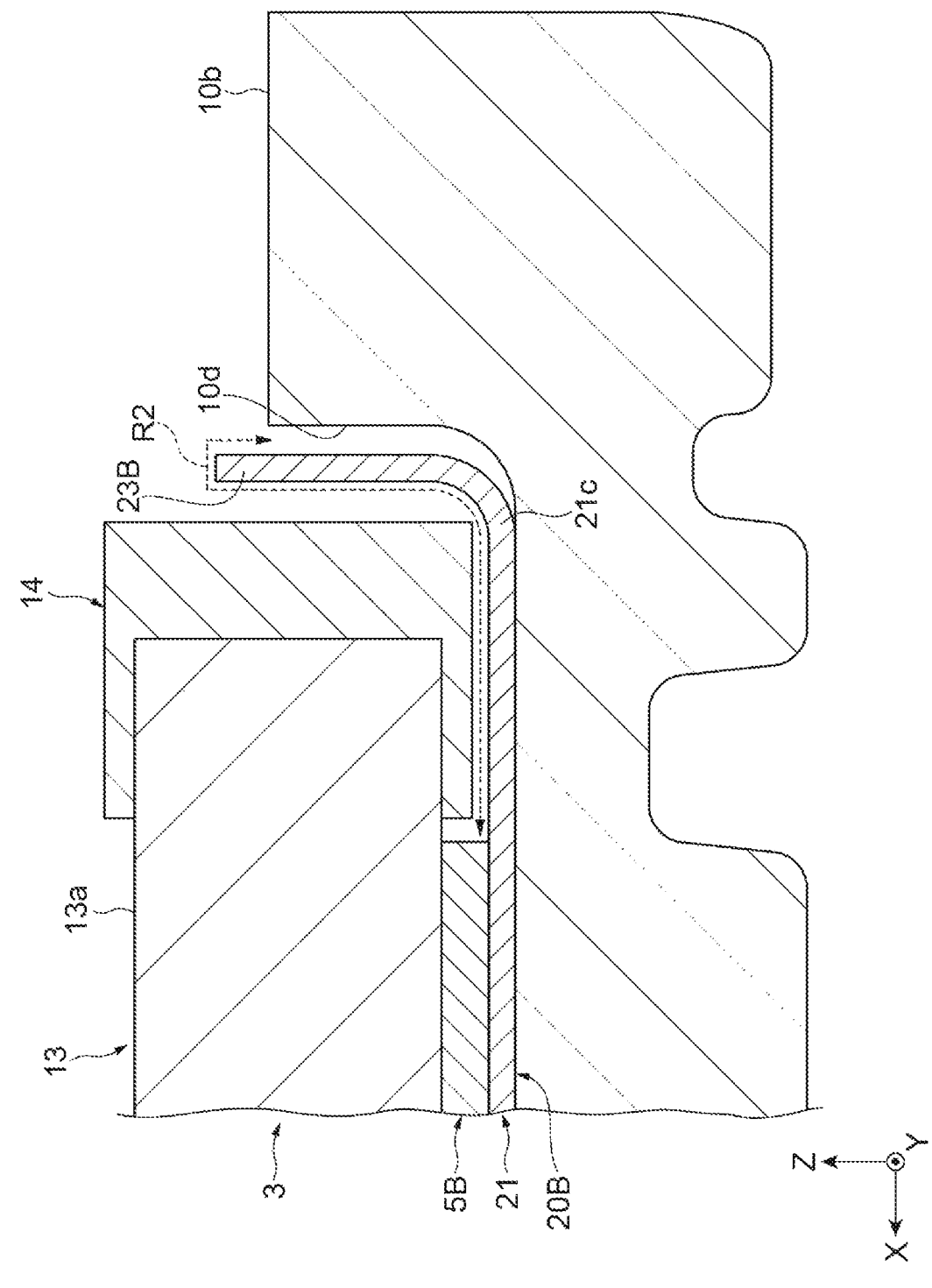
FIG. 7 is a cross-sectional view taken along the line VII-VII in FIG. 4.
Figure 8:
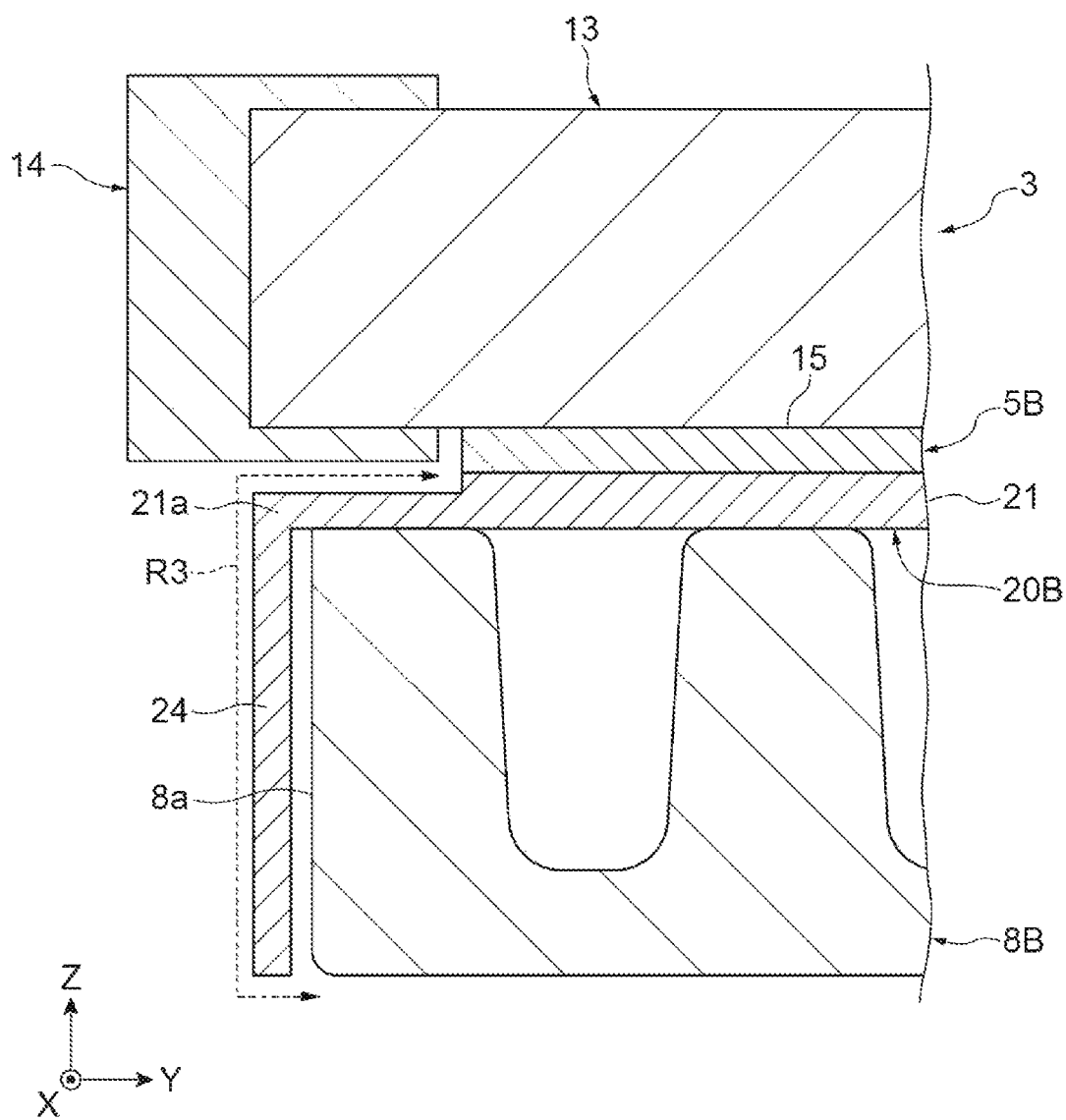
FIG. 8 is a cross-sectional view taken along the line VIII-VIII in FIG. 2.

Next, a configuration of the insulator 20 will be described in detail based on a positional relationship between the power storage module 3, the current collector plate 5B, and the restraint plate 8B with reference to FIGS. 3 to 8. FIG. 3 is a developed perspective view illustrating an overall configuration of the insulator 20 and the restraint plate 8B. FIG. 4 is a perspective view illustrating a state in which the current collector plate 5B, the insulating plate 20B, and the restraint plate 8B are assembled. FIG. 5 is a cross-sectional view taken along the line V-V in FIG. 4. FIG. 6 is a cross-sectional view taken along the line VI-VI in FIG. 4. FIG. 7 is a cross-sectional view taken along the line VII-VII in FIG. 4. FIG. 8 is a cross-sectional view taken along the line VIII-VIII in FIG. 2.

As illustrated in FIG. 3, the insulating plate 20B includes a main body portion 21, a liquid receiving portion 22, side wall portions 23A and 23B, and a cover portion 24. In the description below, the explanation will be made based on the posture in which the insulating plate 20B is arranged on the lower side of the power storage module 3 in the vertical direction while considering the relationship with the flow of the electrolytic solution discharged from the power storage module 3. That is, the electrolytic solution flows from the positive side to the negative side in the Z-axis direction. In the following description, sometimes the positive side in the Z-axis direction may be referred to as "upper" and the negative side in the Z-axis direction may be referred to as "lower". The insulating plate 20B is also provided between the restraint plate 8A and the current collector plate 5A arranged on the positive side in the Z-axis direction, and thus, the insulating plate 20B also has a configuration of the same effect such as being vertically symmetrical with the insulating plate 20B on the negative side in the Z-axis direction illustrated in FIG. 3 and the like. Therefore, when the positive side in the Z-axis direction is directed toward the lower side, since the electrolytic solution discharged from the power storage module 3 flows from the negative side to the positive side in the Z-axis direction, the insulating plate 20B on the restraint plate 8A side receives the electrolytic solution.

The main body portion 21 is a plane-shaped portion arranged between the flat plate portion 15 of the current collector plate 5B and the main body portion 11 of the restraint plate 8. The main body portion 21 has a rectangular shape having a longitudinal direction in the Y-axis direction. The main body portion 21 includes outer edge portions 21a and 21b forming a pair of short sides parallel to each other in the X-axis direction on both end sides in the Y-axis direction.

The outer edge portion 21a is arranged on the negative side in the Y-axis direction and the outer edge portion 21b is arranged on the positive side in the Y-axis direction. The main body portion 21 includes outer edge portions 21c and 21d forming a pair of long sides parallel to each other in the Y-axis direction on both end sides in the X-axis direction. The outer edge portion 21c is arranged on the negative side in the X-axis direction and the outer edge portion 21d is arranged on the positive side in the X-axis direction. The main body portion 21 has substantially the same shape and size as those of the main body portion 11 of the restraint plate 8B. The main body portion 21 is slightly longer than the restraint plate 8B on both sides in the Y-axis direction (refer to FIG. 6 and FIG. 8). The main body portion 21 has a shape and a size that overlap the entire area of the flat plate portion 15 of the current collector plate 5B when viewed from the Z-axis direction.

The liquid receiving portion 22 is a portion provided on the outer edge portion 21b of the positive side of the main body portion 21 in the Y-axis direction, and receives the electrolytic solution discharged from the power storage module 3. As illustrated in FIG. 4, a pressure adjustment valve 18 communicating with an accommodation space for accommodating the electrolytic solution together with the stacked body 13 is provided on a side surface 3a on the positive side of the power storage module 3 in the Y-axis direction. The pressure adjustment valve 18 is a valve that preferentially discharges the internal electrolytic solution when the pressure reaches a predetermined level if an abnormality occurs in the internal pressure of the power storage module 3. That is, among the side surfaces of the power storage module 3, the side surface 3a on the positive side in the Y-axis direction on which the pressure adjustment valve 18 is provided corresponds to a location where the electrolytic solution is most easily discharged. On the other hand, the insulating plate 20B has a liquid receiving portion 22 at the outer edge portion 21b on the positive side in the Y-axis direction, which is a position corresponding to the pressure adjustment valve 18. As described above, the liquid receiving portion 22 is arranged at a position corresponding to at least the pressure adjustment valve 18 when viewed from the Z-axis direction which is the stacking direction, and stores the electrolytic solution discharged from the power storage module 3. As a result, the liquid receiving portion 22 can quickly receive the electrolytic solution discharged from the pressure adjustment valve 18. In the figure, the pressure adjustment valve 18 is formed in a plurality of regions (four regions in total), but a multi-stage discharge port can be provided in one region.

As illustrated in FIG. 4 to FIG. 6, the liquid receiving portion 22 is recessed toward the lower side, that is, the negative side in the Z-axis direction (the side opposite to the power storage module 3). As a result, the liquid receiving portion 22 is recessed toward the lower side, and forms an internal space SP (refer to FIG. 5) that functions as a container capable of receiving the electrolytic solution. The internal space SP is open on the upper surface side and extends in the X-axis direction along the outer edge portion 21b of the main body portion 21. The internal space SP is arranged below the pressure adjustment valve 18. The internal space SP extends in the X-axis direction so as to be arranged below all the pressure adjustment valves 18.

Specifically, as illustrated in FIG. 4, the liquid receiving portion 22 includes a pair of accommodation side wall portions 31 and 32 facing in the Y-axis direction, and a bottom wall portion 33 configuring the bottom surface that receives the electrolytic solution. The liquid receiving portion 22 is configured in a recess shape by the bottom wall portion 33 and the accommodation side wall portions 31 and 32. The accommodation recess portion 35 is formed by the structure of recess shape. A drainage nozzle 37 is provided in the liquid receiving portion 22, and the drainage nozzle 37 discharges the electrolytic solution stored in the liquid receiving portion 22 to a drainage storage portion 50 (refer to FIG. 1) in the power storage device 1. As shown in FIG. 1, the drainage storage portion 50 is connected to a connection line 51, and the connection line 51 is connected to the drainage nozzle 37. The drainage storage portion 50 is configured with a drainage tray, a drainage tank, and the like for storing the discharged electrolytic solution.

As illustrated in FIG. 4, the accommodation side wall portion 31 extends to the lower side from the outer edge portion 21b of the main body portion 21. The accommodation side wall portion 32 faces the accommodation side wall portion 31 at a position separated from the accommodation side wall portion 31 toward the positive side in the Y-axis direction so as to be parallel to the accommodation side wall portion 31. The accommodation side wall portions 31 and 32 have the same shape when viewed from the Y-axis direction. The accommodation side wall portions 31 and 32 have a shape corresponding to the outer edge portion 8b (refer to FIG. 3) of the positive side of the restraint plate 8B in the Y-axis direction when viewed from the Y-axis direction, and also functions as a cover portion that covers the outer edge portion 8b. Therefore, the accommodation side wall portion 31 faces the outer edge portion 8b of the restraint plate 8B in a state of being close to each other in the Y-axis direction (refer to FIG. 6). The accommodation side wall portions 31 and 32 extend over the overall length of the outer edge portion 21b of the main body portion 21 in the X-axis direction, and further extend so as to cover the edge portions 10 on both sides of the restraint plate 8E in the X-axis direction. The separation distance of the accommodation side wall portion 32 from the accommodation side wall portion 31 in the Y-axis direction is not particularly limited, and can be appropriately set according to an amount of electrolytic solution that may be discharged from the power storage module 3. At least, the accommodation side wall portion 32 is provided at a position on the positive side in the Y-axis direction with respect to the pressure adjustment valve 18 (refer to FIG. 6).

The bottom wall portion 33 extends in the Y-axis direction between the accommodation side wall portion 31 and the accommodation side wall portion 32, and extends in the X-axis direction so as to correspond to the entire area of the outer edge portion 21a of the main body portion 21. As illustrated in FIG. 5, the bottom wall portion 33 includes inclined portions 34A and 34B and a bottom portion 36. The bottom portion 36 is arranged at the center position of the main body portion 21 in the X-axis direction. The inclined portion 34A is arranged on the positive side of the bottom portion 36 in the X-axis direction. The inclined portion 34B is arranged on the negative side of the bottom portion 36 in the X-axis direction.

The inclined portions 34A and 34B are inclined with respect to the plane direction (XY-plane direction) of the main body portion 21. The inclined portion 34A is connected to the bottom portion 36 by inclining from the position of the outer edge portion 21d on the positive side of the main body portion 21 in the X-axis direction toward the lower side on the negative side in the X-axis direction. The inclined portion 34B is connected to the bottom portion 36 by inclining from the position of the outer edge portion 21c on the negative side of the main body portion 21 in the X-axis direction toward the lower side on the positive side in the X-axis direction.

The bottom portion 36 extends parallel to the XY-plane direction between the inclined portion 34A and the inclined portion 34B. The bottom portion 36 corresponds to a position farthest from the power storage module 3 in the Z-axis direction, that is, the lowest position among the bottom wall portion 33. Therefore, the electrolytic solution that has fallen into the internal space SP is guided by the inclined surfaces of the inclined portions 34A and 34B and collected in the bottom portion 36. The drainage nozzle 37 is formed in such a bottom portion 36. In this way, the drainage nozzle 37 is provided at the position of the bottom wall portion 33 which is the lowest side in the Z-axis direction. The drainage nozzle 37 is a tubular member extending in the vertical direction. The drainage nozzle 37 is open at the position of the bottom portion 36 and extends downward from the bottom portion 36.

A plurality of ribs 39 extending downward are provided on the lower surface of the bottom wall portion 33. The rib 39 extends in the Y-axis direction between the accommodation side wall portion 31 and the accommodation side wall portion 32. The plurality of ribs 39 are arranged so as to be separated from each other at a predetermined interval in the X-axis direction. By providing such a rib 39, the strength of the liquid receiving portion 22 is improved. In addition, the plurality of ribs 39 also have an advantageous effect in ensuring the insulation distance described later.

On both sides in the X-axis direction, the liquid receiving portions 22 have shapes corresponding to the edge portions 10 of the restraint plate 8B. Specifically, an upper wall portion 41 extending toward the outside in the X-axis direction from the upper ends of the side wall portions 23A and 23B is provided. In addition, a side wall portion 42 extending downward from the outer end portion of the upper wall portion 41 in the X-axis direction is formed. The accommodation side wall portions 31 and 32 also extend to the locations corresponding to these upper wall portion 41 and the side wall portion 42 (also refer to FIG. 4).

Figure 9:
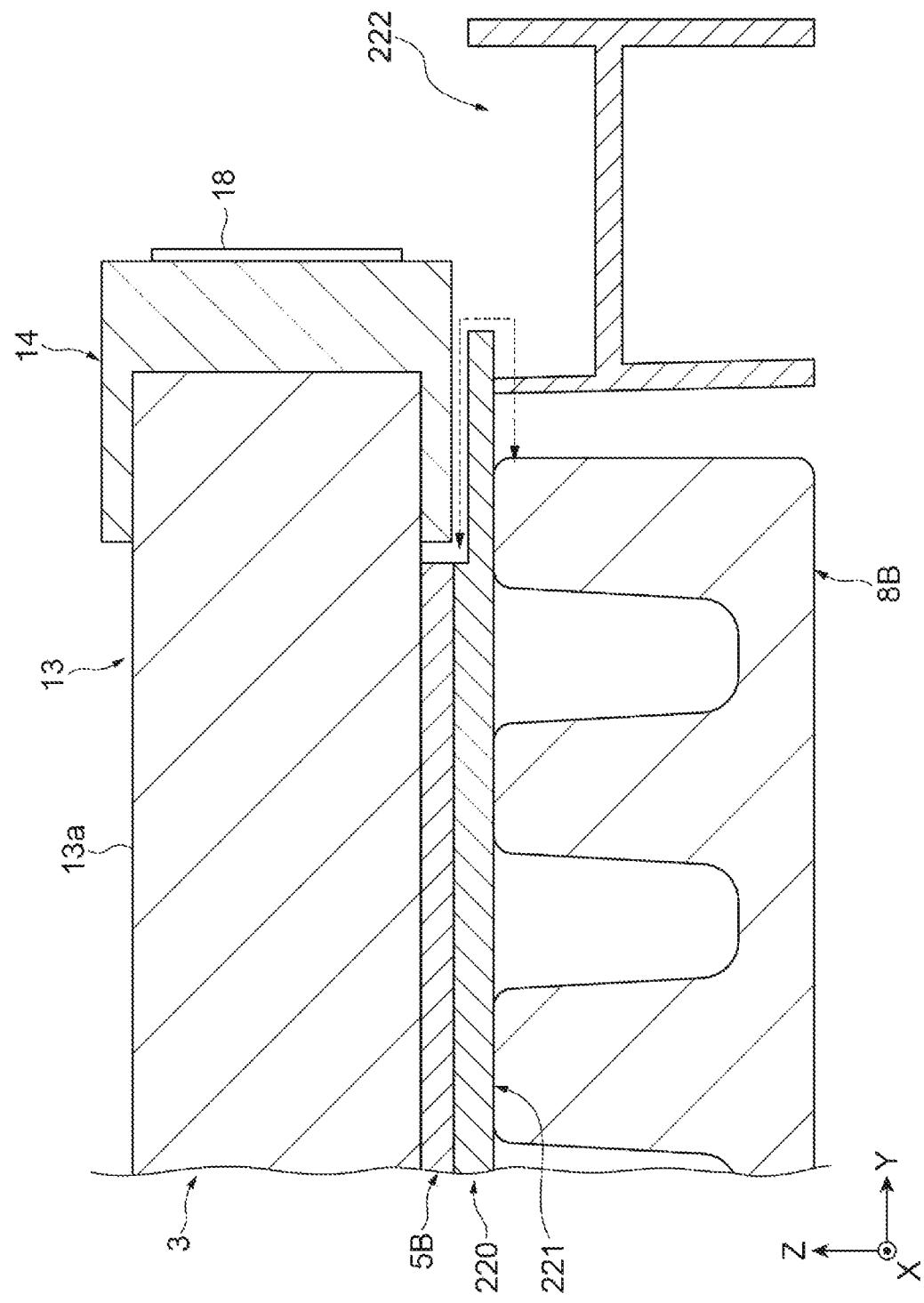
FIG. 9 is a cross-sectional view of a power storage device according to a comparison example.

The main body portion 21 and the liquid receiving portion 22 are integrally formed. Here, the state in which the main body portion 21 and the liquid receiving portion 22 are integrally formed means a state in which the main body portion 21 and the liquid receiving portion 22 are connected without any discontinuity so that the configuration materials are continuously connected. Specifically, as illustrated in FIG. 6, the outer edge portion 21b of the main body portion 21 and the upper end portion of the accommodation side wall portion 31 are connected as the same member in a state in which the configuration materials are continuously connected without the existence of discontinuity (the boundary portion between the main body portion 221 and the liquid receiving portion 222) as illustrated in FIG. 9. When insulating plate 20B is made of resin material, by molding the main body portion 21 and the liquid receiving portion 22 using the same mold, the main body portion 21 and the liquid receiving portion 22 are integrally formed. Alternatively, when the main body portion 21 and the liquid receiving portion 22 are formed in the same process using a 3D printer or the like, both are integrally formed. Alternatively, when the base material is processed by cutting or the like to form the shapes of the main body portion 21 and the liquid receiving portion 22, both are integrally formed.

As shown in FIGS. 3 and 4, the side wall portions 23A and 23B extend to the upper side (power storage module 3 side in the stacking direction) at the locations of the outer edge portions 21d and 21c other than the liquid receiving portion 22. The side wall portions 23A and 23B extend in the Y-axis direction over the overall length of the outer edge portions 21d and 21c. Furthermore, near the end portion on the positive side in the Y-axis direction, the side wall portions 23A and 23B extend up to the accommodation side wall portion 32 of the liquid receiving portion 22.

The side wall portion 23B will be described in more detail with reference to FIG. 7. The side wall portion 23A has a shape symmetrical with the side wall portion 23B in the X-axis direction. The side wall portion 23B rises substantially vertically upward from the outer edge portion 21c of the main body portion 21. The side wall portion 23B is provided so as to face a rising surface 10d on the inside of the edge portion 10 of the restraint plate 8B in the X-axis direction in a state of having a slight gap in the X-axis direction. As a result, the side wall portion 23B is arranged so as to be interposed between the edge portion 10 of the restraint plate 8B, and the current collector plate 5B and the power storage module 3 in the X-axis direction. The side wall portion 23B extends the insulation distance between the current collector plate 5B and the restraint plate 8B to a position higher than the edge portion 10 of the restraint plate 8B. In the present embodiment, the side wall portion 23B extends to a position lower than the power storage module 3, but the extent of extending is not particularly limited.

As illustrated in FIG. 2 and FIG. 3, the cover portion 24 is provided on the outer edge portion 21a of the main body portion 21 on the negative side in the Y-axis direction. The cover portion 24 extends downward from the outer edge portion 21a. The cover portion 24 extends in the X-axis direction over the overall length of the outer edge portion 21a. Furthermore, the cover portion 24 rises upward the outer edge portion 21a so as to cover the edge portion 10 on both sides of the restraint plate 8B, has a portion extending toward the outside in the X-axis direction from the outer edge portion 21a. As illustrated in FIG. 8, the cover portion 24 faces the outer edge portion 8a in the Y-axis direction on the negative side of the restraint plate 8B in the Y-axis direction at a close position. The cover portion 24 extends downward up to substantially the same position as the lower surface of the restraint plate 8B.

The side wall portions 23A and 23B and the cover portion 24 are integrally formed with the main body portion 21. However, the side wall portions 23A and 23B and the cover portion 24 do not necessarily have to be integrally formed with the main body portion 21, and a member different from the main body portion 21 may be attached to the main body portion 21 from the back side.

Next, the actions and effects of the power storage device 1 according to the present embodiment will be described. In the description below, the action and effect of the insulating plate 20B between the current collector plate 5B on the negative side in the Z-axis direction and the restraint plate 8B will be described, but the same action and effect will be realized for the insulating plate 20B between the current collector plate 5A on the positive side in the Z-axis direction and the restraint plate 8A.

In the power storage device 1, the insulating plate 20B is provided between the current collector plate 5B and the restraint plate 8B. The insulating plate 20B is arranged so as to overlap the flat plate portion 15 of the current collector plate 5B when viewed from the stacking direction. As a result, the insulating plate 20B is always interposed at a location where the restraint plate 8B and the current collector plate 5B face each other in the stacking direction. Therefore, insulation between the restraint plate 8B and the current collector plate 5B is ensured. In such a configuration, the insulating plate 20B arranged on the lower side in the stacking direction with respect to the power storage module 3 includes a liquid receiving portion 22 that is arranged at a position corresponding to at least the pressure adjustment valve 18 when viewed from the Z-axis direction, which is the stacking direction and stores the electrolytic solution discharged from the power storage module 3. Therefore, even when the electrolytic solution is discharged from the pressure adjustment valve 18 in the power storage module 3, the liquid receiving portion 22 can receive the electrolytic solution from the pressure adjustment valve 18 (refer to the electrolytic solution L in FIG. 6). In addition, by the insulating plate 20B receiving the electrolytic solution discharged from the liquid receiving portion 22, it is possible to suppress the current collector plate 5B and the restraint plate 8B from being short-circuited via the electrolytic solution.

On the other hand, in the present embodiment, the main body portion 21 and the liquid receiving portion 22 are integrally formed. Therefore, it is possible to suppress the liquid leakage at the boundary portion between the flat plate portion 15 and the liquid receiving portion 22. From the above, it is possible to suppress the liquid leakage to the outside of the device. Even if the electrolytic solution leaks from inside of the power storage module 3, as in the present embodiment, the state in which the collected electrolytic solution which is received by the liquid receiving portion 22 is set not to leaked form an unintended location corresponds to a state in which the leakage to the outside of the device is suppressed.

Here, the insulating plate 220 according to the comparison example will be described with reference to FIG. 9. The insulating plate 220 includes a liquid receiving portion 222 as a separate member from the main body portion 221. The liquid receiving portion 222 is attached to the main body portion 221 by a fitting structure or the like. In this case, the insulation distance between the current collector plate 5B and the restraint plate 8B is the distance along the path (the path of an arrow indicated by a broken line). The path extends from the outer edge portion of the current collector plate 5B to the positive side in the Y-axis direction along the upper surface of the main body portion 221, and goes around the outer edge portion 221b of the main body portion 221 to extend to the negative side in the Y-axis direction along the lower surface of the main body portion 221, and then, reaches the restraint plate 8B. As described above, since the insulation distance is limited to the distance between the upper surface and the lower surface near the outer edge portion 221b on the negative side of the main body portion 221 in the Y-axis direction, a long insulation distance cannot be ensured.

On the other hand, in the insulating plate 20B, the insulation distance between the current collector plate 5B and the restraint plate 8B can be ensured longer than that in the case where the liquid receiving portion 222 and the main body portion 221 are separate bodies as in the comparison example. Specifically, as illustrated in FIG. 6, the path R1 that determines the insulation distance draws a path having an H-shaped cross-section of the liquid receiving portion 22 after folding the outer edge portion 21b from the upper surface of the main body portion 21, and then, reaches the restraint plate 8B from the lower surface of the main body portion 21. In this way, the insulation distance is increased as much as the cross-sectional shape of the liquid receiving portion 22. From the above, the insulation between the restraint plate 8B and the current collector plate 5B can be ensured.

The liquid receiving portion 22 includes the bottom wall portion 33 and the accommodation side wall portions 31, 32, and is configured as a recess shape by the bottom wall portion 33 and the accommodation side wall portion 31 and 32, and the drainage nozzle 37 is provided in the liquid receiving portion 22, and the drainage nozzle 37 discharges the electrolytic solution stored in the liquid receiving portion 22 to a drainage storage portion 50 in the power storage device 1. In this case, an accommodation recess portion of the liquid receiving portion 22 functions as a container that receives the electrolytic solution discharged from the power storage module 3. Therefore, an amount of electrolytic solution that can be received by the liquid receiving portion 22 can be increased. Furthermore, the drainage nozzle 37 can make the electrolytic solution stored in the liquid receiving portion 22 flow to the drainage storage portion 50 so as not to overflow.

The pressure adjustment valve 18 is provided on the end portion of the power storage module 3, and the insulating plate 20B includes a liquid receiving portion 22 at a position corresponding to at least the pressure adjustment valve 18. In this case, in the insulating plate 20B, the liquid receiving portion 22 can be arranged near the pressure adjustment valve 18 where the leakage is likely to occur. Therefore, when the liquid leakage occurs from the pressure adjustment valve 18, the liquid receiving portion 22 can quickly receive the electrolytic solution.

The insulating plate 20B includes the side wall portions 23A and 23B extending to the upper side (one side) in the stacking direction, at a location other than the liquid receiving portion 22 (outer edge portions 21c and 21d) of the outer edge portion of the main body portion 21. In this case, even at a location other than the liquid receiving portion 22, the insulating plate 20B can ensure the insulation distance by the side wall portions 23A and 23B. Specifically, as illustrated in FIG. 7, as indicated in path R2, the insulation distance can be extended by the amount as much as the side wall portion 23B rises. Furthermore, the side wall portions 23A and 23B can also function as an alignment member between the insulating plate 20B and the restraint plate 8B. As a result, by fitting the insulating plate 20B to the edge portion 10 on both sides of the restraint plate 8B along the side wall portions 23A and 23B, the alignment between the insulating plate 20B and the restraint plate 8B can be easily performed. Even at the end portion of the negative side in the Y-axis direction, as indicated in path R3 in FIG. 8, the insulation distance is extended by the amount as much as the cover portion 24.

The bottom wall portion 33 includes inclined portions 34A and 34B that are inclined with respect to the XY-plane direction which is the plane direction of the main body portion 21, and the drainage nozzle 37 is provided at a position that is the lowest side of the bottom wall portion 33 in the Z-axis direction. In this case, the liquid receiving portion 22 can collect the received electrolytic solution by the inclined portions 34A and 34B that are inclined. In addition, the liquid receiving portion 22 can discharge the electrolytic solution from the drainage nozzle 37 such that the collected electrolytic solution does not overflow.

The power storage module 3 includes the current extraction surfaces 13a at both ends in the Z-axis direction, the current collector plate 5B that is in contact with the insulating plate 20B having the liquid receiving portion 22 includes the flat plate portion 15 that is in electrically contact with the current extraction surface 13a of the power storage module 3 and the positive electrode terminal 6 that is connected to the flat plate portion 15 and extracts the current from the power storage module 3, and the positive electrode terminal 6 is provided on the side opposite the liquid receiving portion 22 with respect to the power storage module 3, when viewed from the Z-axis direction. In this case, the current collector plate 5B can extract the current with a high output. In addition, since the positive electrode terminal 6 is arranged on the side opposite the liquid receiving portion 22, it is possible to suppress the current collector plate 5B and the restraint plate 8B from being short-circuited via the positive electrode terminal 6 and the electrolytic solution.

The present disclosure is not limited to the embodiments described above.

For example, the shape of the liquid receiving portion is not limited to the embodiments described above, the shape is not particularly limited as long as the liquid receiving portion is integrally formed with the main body portion 21 and can receive the electrolytic solution leaked from the power storage module 3. For example, the shape may be a curved groove shape, or the main body portion 21 may be simply extended to the positive side in the Y-axis direction and bent so as to rise upward on the tip end side. In addition, the shape of the restraint plate is not particularly limited.

In addition, at least any one of the side wall portions 23A and 23B and the cover portion 24 may be omitted from the insulating plate 20B.

In the embodiment described above, the insulating plate 20B includes the side wall portions 23A and 23B extending to the upper side in the stacking direction at the locations other than the liquid receiving portion 22 (the outer edge portions 21c and 21d) among the outer edge portions of the main body portion 21. However, depending on the shape of the restraint plate, the insulating plate may include a side wall portion that extends to the lower side in the stacking direction. For example, by arranging the side wall portion on the lower side so as to face the side surface of the restraint plate, the alignment between the insulating plate and the restraint plate becomes possible, and thus, the insulation distance can be extended. The insulating plate may include a side wall portion extending to both the upper side and the lower side.

What is claimed is:

1. A power storage device comprising:
  a power storage module;
  a pair of current collector plates configured to be stacked so that the power storage module is disposed between the pair of current collector plates in a first direction that is vertical;
  a pair of insulating plates, wherein the power storage module and the pair of current collector plates are disposed between the pair of insulating plates in the first direction; and
  a pair of restraint plates, wherein the power storage module, the pair of current collector plates, and the pair of insulating plates are disposed between the pair of restraint plates in the first direction,
  wherein the power storage module includes an accommodation space that accommodates an electrolytic solution together with a power generation element,
  a pressure adjustment valve communicating with the accommodation space is provided on a side surface of the power storage module, a first insulating plate of the pair of insulating plates is arranged on a lower side in the first direction with respect to the power storage module and is configured to include;
a main body portion arranged between a first current collector plate of the pair of current collector plates and a first restraint plate of the pair of restraint plates, and
a liquid receiving portion that is provided on an outer edge portion of the main body portion, is arranged at least at a position corresponding to the pressure adjustment valve when viewed from the first direction, and stores the electrolytic solution discharged from the power storage module, and
the main body portion and the liquid receiving portion are integrally formed.

2. The power storage device according to claim 1, wherein the liquid receiving portion includes a bottom wall portion and an accommodation side wall portion, and is formed in a recess shape by the bottom wall portion and the accommodation side wall portion, and
a drainage nozzle is provided in the liquid receiving portion, and the drainage nozzle discharges the electrolytic solution stored in the liquid receiving portion to a drainage storage portion in the power storage device.

3. The power storage device according to claim 2, wherein the bottom wall portion includes an inclined portion that is inclined with respect to a plane direction of the main body portion, and
the drainage nozzle is provided at a position that is a lowest side of the bottom wall portion in the first direction.

4. The power storage device according to claim 1, wherein the first insulating plate includes a side wall portion extending to at least one side in the first direction at a location other than the liquid receiving portion in the outer edge portion of the main body portion.

5. The power storage device according to claim 1, wherein the power storage module includes current extraction surfaces at both ends in the first direction,
the first current collector plate that is in contact with the first insulating plate having the liquid receiving portion includes
a flat plate portion that is in electrical contact with the current extraction surface of the power storage module, and
an extraction portion that is connected to the flat plate portion and extracts a current from the power storage module, and
the extraction portion is provided on a side opposite the liquid receiving portion with respect to the power storage module, when viewed from the first direction.

* * * * *